Oct. 14, 1952          O. C. ROESEN          2,613,578
MACHINE FOR MILLING POCKETS IN CURVED STEREOTYPE PLATES
Filed May 29, 1951          4 Sheets-Sheet 1
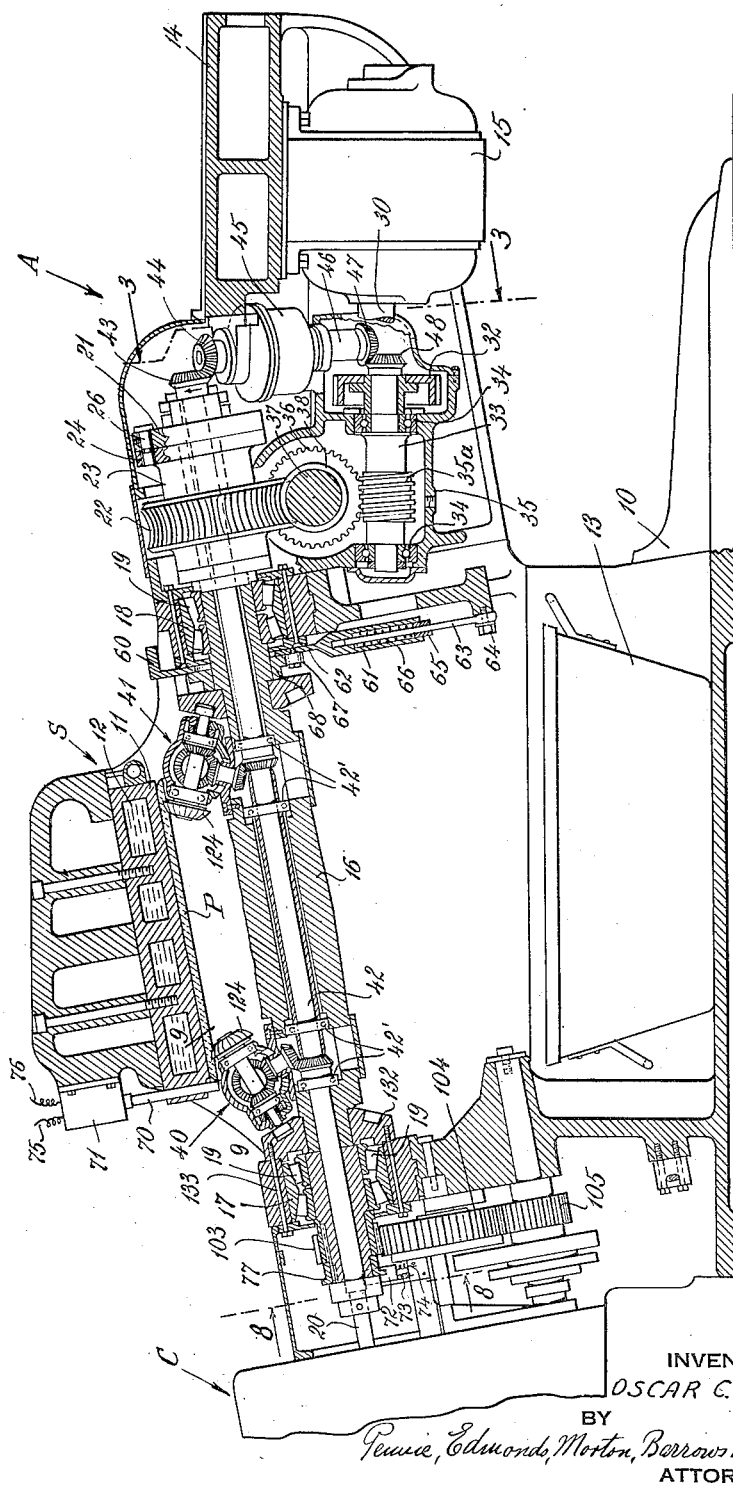
INVENTOR
OSCAR C. ROESEN
BY
Pennie, Edmonds, Morton, Barrows and Taylor.
ATTORNEYS Oct. 14, 1952     O. C. ROESEN     2,613,578
MACHINE FOR MILLING POCKETS IN CURVED STEREOTYPE PLATES
Filed May 29, 1951     4 Sheets-Sheet 2
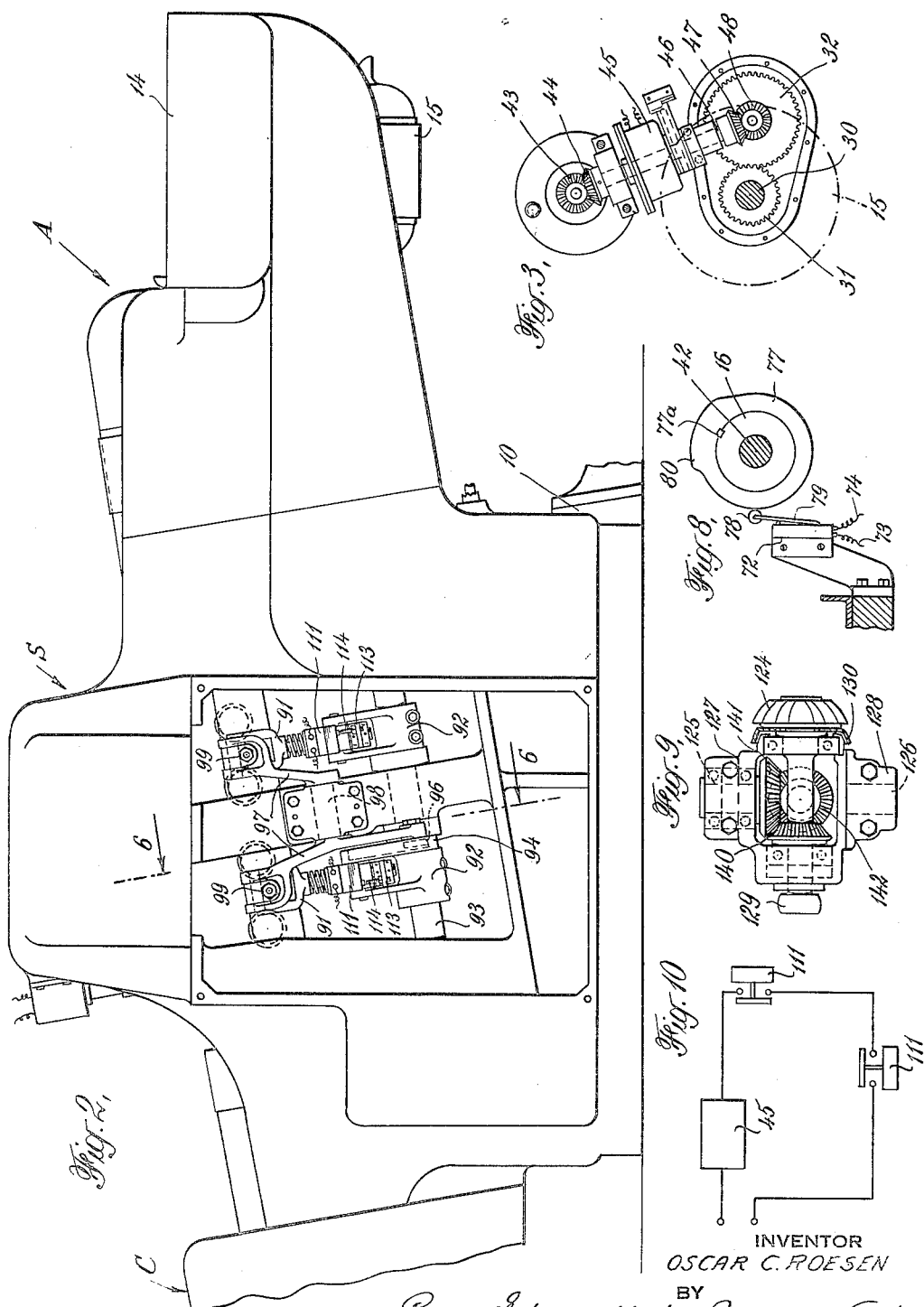
INVENTOR
OSCAR C. ROESEN
BY
Pennie, Edmonds, Morton, Barrows and Taylor
ATTORNEYS

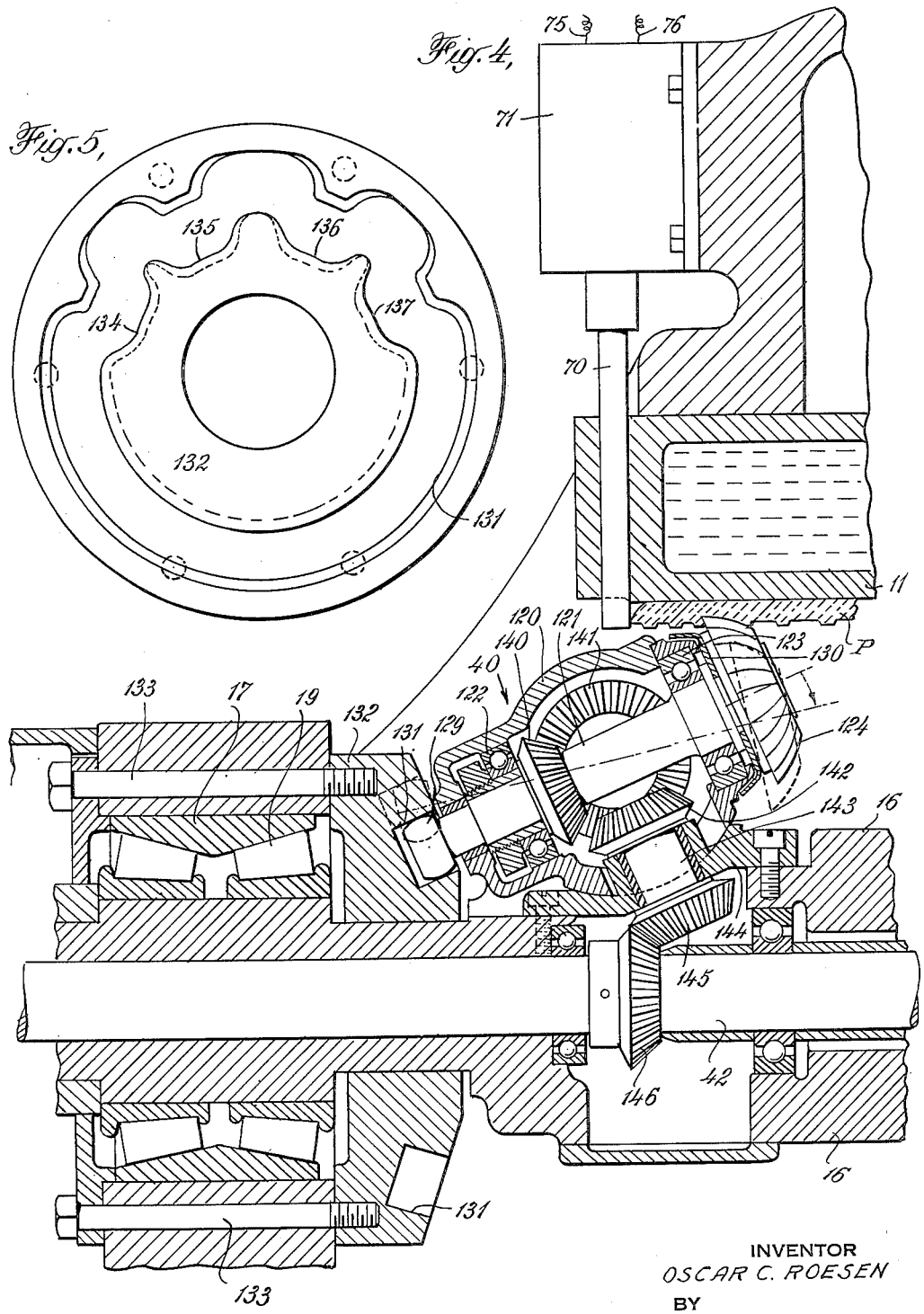

Oct. 14, 1952           O. C. ROESEN           2,613,578
MACHINE FOR MILLING POCKETS IN CURVED STEREOTYPE PLATES
Filed May 29, 1951           4 Sheets-Sheet 4
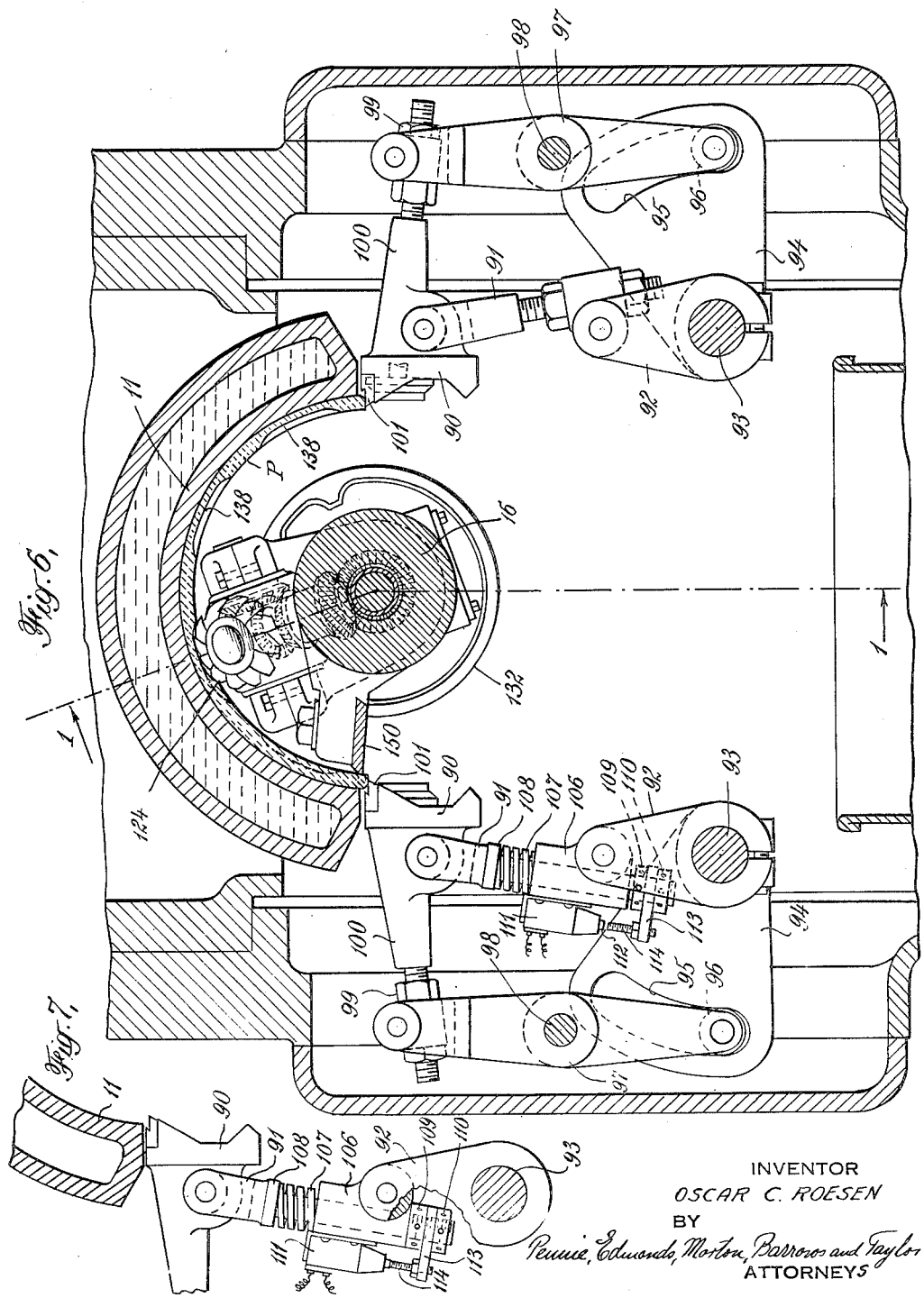
INVENTOR
OSCAR C. ROESEN
BY
Pennie, Edmonds, Morton, Barrows and Taylor
ATTORNEYS Patented Oct. 14, 1952

2,613,578

UNITED STATES PATENT OFFICE 2,613,578

MACHINE FOR MILLING POCKETS IN CURVED STEREOTYPE PLATES

Oscar C. Roesen, Scarsdale, N. Y., assignor to Wood Newspaper Machinery Corporation, Plainfield, N. J., a corporation of Virginia Application May 29, 1951, Serial No. 228,924

8 Claims. (Cl. 90—15)

This invention relates to a stereotype plate finishing machine, and more particularly to improvements in a machine of the type disclosed in United States Patent 2,364,032 whereby the machine, in addition to being useful for shaving semicylindrical stereotype plates to the proper thickness, is also useful in providing a plurality of recesses or pockets along the inner surfaces of the opposite curved edges thereof.

The improved machine of this invention thus includes an inspection platform upon which the plates to be finished are initially placed, a shaving section wherein the stereotype plates are shaved to the proper thickness and recesses or pockets formed in their curved edges, and a cooling and drying section wherein the plates are finally prepared for delivery from the machine. The stereotype plates thus prepared are adapted to be secured to press cylinders by gripping elements that enter the recesses or pockets formed therein and hold the plates under longitudinal tension. The machine of the present invention forms the recesses or pockets which are adapted to receive the gripping elements of a press cylinder by milling them in the precast plates.

It is an object of the present invention to provide a machine of the type described which accurately and rapidly forms a plurality of pockets in the inner surfaces of the curved edges of stereotyped plates and performs this operation on a succession of such plates automatically. Furthermore it is an object of this invention to provide a semicylindrical, stereotype plate finishing machine of this type in which the pockets are milled in a plate during the same operation in which the plate is shaved to proper thickness.

Another object is the provision of an improved machine of this type which is capable of shaving and forming pockets in a succession of plates with a high degree of accuracy and uniformity. A particular feature of the improved machine resides in the provision of but a single milling cutter for cutting a plurality of pockets in one curved inner edge surface of a stereotype plate and means whereby said single milling cutter is controlled to cut first one pocket and then another, and so on, until the full number of pockets in the curved edge of the stereotype plate has been formed.

Another feature of importance is the provision of means in the improved machine for continually driving the plate shaving cutter and intermittently or continually driving the milling cutters. In this respect a further feature of the invention is the provision of automatic means whereby the milling cutters are driven only when a stereotype plate is in the shaving arch and are idle, whether or not the machine is operating, if a stereotype plate is not in the shaving arch.

Another feature is that the shaving of the inner surfaces of the plates immediately precedes the milling therein of the pockets by reason of the fact that the milling cutters are supported upon and rotate with the shaving knife supporting bar but are supported thereon angularly to one side of the shaving knife, the knife bar being driven in a direction such that the shaving knife precedes the milling cutters.

Other objects, advantages and characteristic features of the invention will become apparent from the following description of certain embodiments of my improved machine. In describing this invention in detail, reference will be made to the accompanying drawings in which certain embodiments of my invention have been illustrated and in which:

Fig. 1 is a side elevation in section of a machine embodying my invention on line 1—1 of Fig. 6;

Fig. 2 is a side elevation of the machine of Fig. 1;

Fig. 3 is a sectional view of a portion of the driving means for the knife bar and milling cutters on line 3—3 of Fig. 1;

Fig. 4 is an enlarged section of a portion of the machine illustrating more clearly one milling cutter;

Fig. 5 is an elevation of the face of one of the cams by which the milling cutters are controlled to form successive pockets in the plate;

Fig. 6 is a cross section of the machine on line 6—6 of Fig. 2 and showing a stereotype plate located in the shaving arch;

Fig. 7 is a partial section illustrating one of the means for supporting the plate within the shaving arch in position to so support a plate therein but with no plate in the arch;

Fig. 8 is a section on line 8—8 of Fig. 1 illustrating more clearly the means for controlling the shaving arch plate stop;

Fig. 9 is a plan view of one of the milling cutters illustrating the pivotal mounting thereof; and Fig. 10 is a diagrammatic illustration of a wiring circuit for controlling a magnetic clutch through which the milling cutters are driven.

The machine as illustrated in Fig. 1 comprises three general sections, namely, an inspection platform and lead-in section A, a plate-shaving and pocket-milling section S and a cooling and drying section C. As indicated previously, the machine constitutes an improvement of the machine of United States Patent 2,364,032, the general layout thereof, as well as many parts, being the same as those of the machine of the patent. As these are fully disclosed and described in the patent, a description thereof will not be here repeated except when necessary to render a complete understanding of the present invention.

As cooling section C of the improved machine of this invention is identical to the cooling section of the machine of the patent, it need not be here described at all and is partially illustrated in outline only to indicate its presence in the present machine. The main frame of the machine includes a base 10 and a shaving arch 11 which is preferably in part hollow to provide for the circulation of a cooling fluid 12 therethrough. The pedestal 10 is provided with a space to receive a hopper 13 in which may be collected the shavings and milling chips as stereotype plates are being finished in the machine. At the right hand end of the machine, as seen in the abovementioned figures, is located an inspection platform 14 beneath and from which is hung a motor 15 by which all of the various parts of the machine are driven.

A knife bar 16 is supported concentrically and axially of the shaving arch 11 in a pair of thrust bearings 17 and 18. Thrust bearings 17 and 18 include a plurality of taper bearings 19 which are held in position by pillow blocks, the latter in turn being secured as by bolts to the main frame of the machine. An extension 20 of the knife bar extends into and controls the passage of plates through the cooling section C of the machine.

At its upper or right hand end, as seen in Fig. 1, the knife bar 16 is provided with a hub or flange 21 and supports inwardly thereof a worm wheel 22 mounted on a sleeve 23 having a corresponding flange or hub 24. The worm wheel 22 and its supporting sleeve 23 are mounted for free rotation on the knife bar but are connected thereto through a driving connection comprising a shear pin 26 which extends through hub 21 of the knife bar as well as through the hub or flange 24 of the sleeve 23.

The operating power as above mentioned is provided by the electric motor 15 supported below the inspection platform 14. Referring to Figs. 1 and 3, the motor 15 has a drive shaft 30 supporting a pinion 31 which engages a spur gear 32 carried on a shaft 33 supported by bearings 34 within a housing or casing 35 which forms a part of the main machine frame. Between roller bearings 34, a worm 35a is secured to shaft 33 which engages a worm wheel 36 carried on a shaft 37 which also supports a worm 38. Worm 38 meshes with and drives worm wheel 22 and thereby the knife bar 16.

A pair of milling cutters 40 and 41 (Fig. 1) as will hereinafter be more fully described are pivotally or rockably supported on the knife bar 16 and are provided with driving power through a drive shaft 42 which is located axially within the knife bar 16 in bearings 42' and which has secured to its upper or right hand end a bevel gear 43. A second bevel gear 44 mounted on the output shaft of a magnetic clutch 45 meshes with and provides driving power through gear 43 to the milling cutter drive shaft 42 when the magnetic clutch is energized as will also be hereinafter described. The input shaft 46 of the magnetic clutch supports on its outer end a bevel gear 47 which meshes with and is driven by a bevel gear 48 secured to shaft 33 at the right hand end thereof as seen in Fig. 1. Thus when the magnetic clutch is energized, the milling cutter drive shaft 42 is driven by the electric motor 15 because shaft 33, as heretofore explained, is driven by reason of spur gear 32 and pinion 31. However, whereas the knife bar is continually rotated during operation of motor 15, the milling cutter drive shaft 42 is driven only when magnetic clutch 45 is energized.

A plate stop 60 (Fig. 1) is mounted to surround the knife bar 16 adjacent thrust bearing 18 and for reciprocation transversely of the knife bar. This plate stop 60 maintains a stereotype plate in readiness for entrance into the shaving arch 11 and is continually urged upwardly by a spring-urged member 61 which engages its lower end 62. Member 61 is supported by a shaft 63 secured by a bolt 64 to the main frame of the machine and has a collar 65 secured to it between which and the member 61 a spring 66 is maintained in compression. The lower end 62 of the plate stop 60 is also provided with a cam follower 67 adapted to engage the surface of a cam 68 secured to and rotated by knife bar 16. In Fig. 1 the plate stop 60 is illustrated in the position it assumes to hold a plate in preparation for admission to the shaving section S of the machine but at the proper point in the sequence of operation controlled by the rotation of the knife bar 16 the cam follower 67 and the plate stop are urged downwardly by the cam 68 against the resilient action of member 61 and permits a stereotype plate to pass on into the shaving section S of the machine.

A further plate stop 70 is provided to limit the travel of a stereotype plate P entering the shaving arch S (Fig. 1). This plate stop is controlled by a solenoid 71 which, in turn, is energized or deenergized through a switch 72 located adjacent the lower or left hand end of the knife bar 16. Switch 72 is provided with leads 73 and 74 which are connected (by means not shown) to leads 75 and 76 of the solenoid 71. Operation of the switch 72 is controlled by a cam 77 (Figs. 1 and 8) the surface of which engages a cam follower 78 supported upon the actuating arm 79 of switch 72. Cam 77 is secured as by a key 77a to the knife bar 16. When the parts are in the position as illustrated in Fig. 8, the solenoid 71 is deenergized and the plate stop 70 is maintained in its lower position by gravitational force to hold the stereotype plate P in the shaving arch. However, when the dwell 80 of the cam engages cam follower 78 of the switch 72, the switch is closed and the solenoid 71 energized to withdraw plate stop 70 to permit the plate P to leave the shaving arch. If desired, spring means may be employed to normally urge the plate stop 70 downwardly into plate-stopping position.

By reference now to Figs. 2, 6 and 7, the means for urging a stereotype plate P firmly into the shaving arch 11 will be described. This means is substantially identical to the corresponding means illustrated and fully described in the aforementioned United States Patent 2,364,032 and need not therefore be here repetitiously described in detail. Suffice it to say that it comprises a pair of lifter or toggle bars 90 adapted to engage the circumferential end edges of a plate P. The lifter bars 90 are supported on the upper ends of lifter rods 91 which in turn are supported by levers 92 secured to shafts 93. Also secured to shafts 93 are cams 94 having cam grooves 95 in which a roller or cam follower 96 rides. Cam followers 96 are supported on the lower ends of pinching fork levers 97 pivotally supported on fixed pivots 98 and pivotally supporting at their upper ends adjustable nut and bolt units 99 adapted to engage studs 100 secured to lifter bars 90. Through the above described mechanism, the lifting bars 90, by engaging opposite edges of a plate P through ledge members 101, urge plate P into the shaving arch 11 upon rotation of shafts 93. The operating shafts 93 for the plate lifting mechanism described are rotated back and forth by the cutter bar 16 through a spur gear 103 secured to its lower or left hand end (Fig. 1) and through gears 104 and 105, a cam 151 and a link 152 as more fully described in the aforementioned United States patent.

Referring again to Fig. 6, it will be noted that the lifting means for the right hand lower edge of the stereotype plate P there illustrated is non-resilient by reason of the direct connection between the right hand shaft 93 and the right hand lifter bar 90. However, the lifting means illustrated to the left in this figure is resilient in that the lifting rod 91 thereof extends through pivotal sleeve 106 free from connection therewith except through a compression spring 107 which engages a collar 108, on the lifting rod 91, and the sleeve 106. At its lower end, however, this lifting rod has threaded thereon a pair of lock nuts 109 and 110, the upper one of which, namely, lock nut 109 prevents the spring 107 from urging the lifting rod 91 out of the sleeve 106.

A normally closed micro-switch 111 is fixedly secured to the pivotal sleeve 106 and is adapted to be actuated or opened by member 112 extending from the lower end thereof. A plate 113 having a switch actuating member 114 adjustably secured thereto is secured to the lower end of lifting rod 91 between lock nuts 109 and 110. The micro-switch 111 is adapted to control the energization of the magnetic clutch 45 which in turn controls the driving power supplied to the milling cutters 40 and 41 and furthermore is adapted to be energized only when a stereotype plate P is present in the shaving arch 11 as described below. In an idle operation as illustrated in Fig. 7, that is, when the lifter bar 90 is raised with no plate P in the shaving arch 11, the switch actuating member 114 maintains the micro-switch 111 open by engaging the actuating member 112 thereof. Thus the magnetic clutch 45 is maintained de-energized so that the milling cutters 40 and 41 do not operate. On the other hand, when a stereotype plate P is clamped in the shaving arch 11 as illustrated in Fig. 6, the lifter rod 91 is in a somewhat lower position and the compression spring 107 slightly more compressed. In this condition, the switch actuating member 114 carried by the plate 113 is maintained out of engagement with member 112 of the switch 111 and the switch contacts are allowed to close, thereby energizing the magnetic clutch 45 and thus the milling cutters 40 and 41 to cut pockets in the plate P.

As illustrated in Fig. 2 there are a pair of lifting members adjacent one side of the shaving arch and thus there are two micro-switches which must be permitted to close in order to energize the magnetic clutch 45. A somewhat diagrammatic circuit drawing is illustrated in Fig. 10 showing the circuit containing the two micro-switches 111 and the magnetic clutch 45.

It will thus be apparent from the above that only when a plate is in the shaving arch for shaving and pocket-cutting will the milling cutters 40 and 41 be operated. The reason for this is, of course, that if high speed cutters, such as are the milling cutters to be more fully described below, are permitted to rotate during an idle operation of the machine, that is, when there is no plate in the shaving arch, the cutters may throw small chips of metal which are apt to stick to the concave surface of the shaving arch 11, and when a subsequent plate is located in the arch, these small chips may attach themselves to the plate and cause minute imperfections in printing. It is therefore important that the operation of the milling cutters be discontinued prior to removal of a stereotype plate from the shaving arch 11 and not be initiated until another stereotype plate has been clamped therein.

It will also be apparent that, if desirable, plate-lifting means on both sides of the shaving arch may be provided with micro-switches 111 and the operating members therefor, but it has been found that the provision thereof on the lifting means at but one side of the shaving arch is satisfactory.

Referring now to Figs. 1, 4, 5 and 9, the milling cutters and the operating control means therefor will be described. As both are the same, only milling cutter 40 and its operating controls need be described in detail. In Fig. 4 milling cutter 40 is shown in enlarged section and comprises a casing 120 in which is supported a shaft or spindle 121 in bearings 122 and 123. The casing 120 of the milling cutter 40 is supported (Fig. 9) by trunnions 125 and 126 pivotally mounted in bearings 127 and 128, respectively, which are fixedly secured to the knife bar 16. Thus the milling cutter 40 is supported for pivotal movement in a plane radial to the axis of the knife bar and extending longitudinally of the arch. Spindle 121 supports on its outer end a cutter head 124 which may thus be moved into engagement with a curved edge of stereotype plate P to cut therein a pocket, or pockets. A shield 130 prevents chips from entering the casing 120.

On the end of the shaft 121 opposite the end which supports the cutter 124 is mounted a cam follower 129 which is adapted to ride in the cam-way 131 of a cam 132 secured against rotational movement by being secured to the main frame of the machine by a plurality of bolts 133. The shape of the cam path 131 is clearly illustrated in Fig. 5 and is provided with four dwells 134, 135, 136 and 137 which cause the milling cutter housing 120 to be rocked four times in one revolution of the knife bar 16 whereby four pockets 138 are formed in the inner surface of the adjacent curved edge of the stereotype plate P.

The driving means for the cutter head 124 of the milling cutter 40 comprises a bevel gear 140 secured to the shaft 121 which supports the cutter head 124, a bevel gear 141 meshing therewith and supported on the inner end of the trunnion 125 and a bevel gear 142 which is supported upon a shaft 143 extending through a removable member 144 secured to the knife bar 16, the bevel gear 142 continually meshing with the bevel gear 141. At the lower end of the shaft 143 is secured a bevel gear 145 which meshes with a bevel gear 146 secured to the milling cutter drive shaft 42. It will be apparent by reference to Fig. 4 that the driving force from drive shaft 42 is continually provided to the cutter 124 through the above described gearing in all pivotal positions of the milling cutter 40.

It should perhaps be pointed out by reference to Fig. 6 that the knife bar 16 is rotated in such a direction that a shaving blade 150 supported thereon precedes the milling cutters in their passage through a plate containing arch. The reason for this will be obvious, it is believed, in that were the pockets milled or cut in the plate prior to the shaving thereof, the edge of the shaving knife 150 might engage the edges of the pockets and imperfectly shave the plate.

After a stereoype plate has been shaved to the desired thickness in the shaving section S of the machine and has had the recess or pockets 138 formed therein in this section, the plate will be automatically released from the shaving arch and passed on to the cooling and drying section C of the machine as is fully and clearly described in the aforementioned United States Patent 2,364,032.

I claim:

1. In a machine for milling pockets in the interior surfaces of curved steretoype plates adjacent the curved edges thereof, the combination with a plate-supporting arch and a rotary shaft extending axially of said arch of a cutter arm extending longitudinally of said arch adjacent one end thereof, means pivotally supporting said cutter arm to swing in a plane extending longitudinally of said arch, a cutter mounted on said cutter arm and movable thereby toward and away from said arch, and means for rocking said cutter arm to move said cutter toward and away from said arch.

2. In a machine for milling pockets in the interior surfaces of curved steretoype plates adjacent the curved edges thereof, the combination with a plate supporting arch and a rotary shaft extending axially of said arch of a cutter arm extending longitudinally of said arch adjacent one end thereof, means pivotally supporting said cutter arm upon said rotary shaft for rotation therewith and to swing in a plane extending longitudinally of said arch, a cutter mounted on said cutter arm and movable thereby toward and away from said arch, and means for rocking said cutter arm to move said cutter toward and away from said arch.

3. In a machine for milling pockets in the interior surfaces of curved stereotype plates adjacent the curved edges thereof, the combination with a plate supporting arch and a rotary shaft extending axially of said arch of a cutter arm extending longitudinally of said arch adjacent one end thereof, means pivotally supporting said cutter arm upon said rotary shaft for rotation therewith and to swing in a plane extending longitudinally of said arch, a cutter mounted on said cutter arm and movable thereby toward and away from said arch, means for rocking said cutter arm to move said cutter toward and away from said arch, and a plate-shaving knife supported on said rotary shaft and extending axially of said arch.

4. In a machine for milling pockets in the interior surfaces of curved stereotype plates adjacent the curved edges thereof, the combination with a plate-supporting arch and a rotary shaft extending axially of said arch of a rotary cutter arm extending longitudinally of said arch adjacent one end thereof, means pivotally supporting said cutter arm upon said rotary shaft for rotation therewith and to swing in a plane extending longitudinally of said arch, a rotary drive shaft for rotating said cutter arm, said drive shaft being supported concentrically within said rotary shaft, a cutter mounted on said cutter arm and movable thereby toward and away from said arch, and means for rocking said cutter arm to move said cutter toward and away from said arch.

5. In a machine for milling pockets in the interior surfaces of curved steretoype plates adjacent the curved edges thereof, the combination with a plate-supporting arch and a rotary shaft extending axially of said arch of a rotary cutter arm extending longitudinally of said arch adjacent one end thereof, means pivotally supporting said cutter arm to swing in a plane extending longitudinally of said arch, a cutter mounted on said cutter arm for rotation and movable thereby toward and away from said arch, means for rocking said cutter arm to move said cutter toward and away from said arch, and means for rotating said cutter arm and cutter.

6. In a machine for milling pockets in the interior surfaces of curved stereotype plates adjacent the curved edges thereof, the combination with a plate-supporting arch and a rotary shaft extending axially of said arch of a rotary cutter arm extending longitudinally of said arch adjacent one end thereof, means for maintaining a steorotype plate in said supporting arch, means pivotally supporting said cutter arm to swing in a plane extending longitudinally of said arch, a cutter mounted on said cutter arm for rotation and movable thereby toward and away from said arch, means for rocking said cutter arm to move said cutter toward and away from said arch, means for rotating said cutter arm, and means responsive to said means for maintaining a stereotype plate in said arch, when a plate is supported in said arch, for causing the operation of said means for rotating said cutter arm and cutter.

7. In a machine for milling pockets in the interior surfaces of curved stereotype plates adjacent the curved edges thereof, the combination with a plate-supporting arch and a rotary shaft extending axially of said arch of a cutter arm extending longitudinally of said arch adjacent one end thereof, means pivotally supporting said cutter arm to swing in a plane extending longitudinally of said arch, a cutter mounted on one end of said cutter arm and movable thereby toward and away from said arch, a cam follower supported on the other end of said cutter arm, and a cam engaging said cam follower and adapted to rock said cutter arm to move said cutter toward and away from said arch.

8. In a machine for milling pockets in the interior surfaces of curved stereotype plates adjacent the curved edges thereof, the combination with a plate-supporting arch and a rotary shaft extending axially of said arch of a cutter arm extending longitudinally of said arch adjacent one end thereof, means pivotally supporting said cutter arm upon said rotary shaft for rotation therewith and to swing in a plane extending longitudinally of said arch, a cutter mounted on one end of said cutter arm and movable thereby toward and away from said arch, a cam follower mounted on the other end of said cutter arm, and a cam fixedly mounted on a stationary part of said machine and engaging said cam follower to rock said cutter arm during rotation of said rotary shaft.

OSCAR C. ROESEN.

REFERENCES CITED

The following references are of record in the file of this patent:

UNITED STATES PATENTS

| Number | Name | Date |
|---|---|---|
| 2,364,032 | Wood | Nov. 28, 1944 |
| 2,531,647 | Roesen | Nov. 28, 1950 |